(12) United States Patent
Kindersley

(10) Patent No.: US 7,607,640 B2
(45) Date of Patent: Oct. 27, 2009

(54) ROTARY VALVE ACTUATOR

(75) Inventor: Peter Kindersley, Queensbury, NY (US)

(73) Assignee: Engineered Valves International Inc., Glen Falls, NY (US)

( * ) Notice: Subject to any disclaimer, the term of this patent is extended or adjusted under 35 U.S.C. 154(b) by 482 days.

(21) Appl. No.: 11/260,457

(22) Filed: Oct. 28, 2005

(65) Prior Publication Data

US 2006/0097212 A1    May 11, 2006

Related U.S. Application Data

(60) Provisional application No. 60/625,938, filed on Nov. 9, 2004.

(51) Int. Cl.
*F16K 31/44* (2006.01)

(52) U.S. Cl. .................. 251/250; 251/294; 74/89.21

(58) Field of Classification Search ........... 251/250, 251/248, 294; 74/89.21, 89.2
See application file for complete search history.

(56) References Cited

U.S. PATENT DOCUMENTS

| 1,363,034 | A | * | 12/1920 | Bosworth | 474/245 |
| 2,983,479 | A | * | 5/1961 | Thomas | 251/250 |
| 3,272,050 | A | * | 9/1966 | Barley | 83/390 |
| 4,003,484 | A | * | 1/1977 | Jones et al. | 74/89.2 |
| 4,366,722 | A | * | 1/1983 | Hasler | 74/99 R |
| 4,596,377 | A | * | 6/1986 | Taylor | 251/248 |

* cited by examiner

*Primary Examiner*—Stephen Hepperle
*Assistant Examiner*—Andrew J Rost
(74) *Attorney, Agent, or Firm*—Nixon & Vanderhye PC

(57) ABSTRACT

A rotary valve actuator that effects rotary movement of a rotary valve includes a heavy plate member coupled with a linear motive source, which reciprocates the plate member between a first position and a second position. A first pair of flexible pull connectors, such as lengths of roller chain, are attached to the end of the plate member, and wrap around a wheel. At least one second flexible pull connector is disposed between said first flexible pull connectors and is attached to the other end of the plate member, and wraps around the wheel in the opposite direction of winding as for the first flexible connector.

21 Claims, 4 Drawing Sheets

ACTUATOR SHOWN AT 45° OF 180° TOTAL ROTATION

90° ACTUATOR, SHOWN IN MID STROKE

0° START POSITION

90° STROKED POSITION

DEVICE SHOWN IN MID STROKE

ROTARY VALVE ACTUATOR

CROSS-REFERENCES TO RELATED APPLICATIONS

This application claims the benefit of U.S. Provisional Patent Application Ser. No. 60/625,938, filed Nov. 9, 2004, the entire content of which is herein incorporated by reference.

BACKGROUND OF THE INVENTION

The present invention relates generally to valve actuators and, more particularly, to a valve actuator having a novel way to translate a linear motion and force to a rotary motion and force, applicable to rotary actuators for rotary valves.

Rotary actuators for rotary valves such as ball, butterfly, plug, and sector valves, usually provide a 90° turn to the valve shaft, from the closed position to the open position and back. Some valve forms, notably multi-port valves, require 120° and 180° turning. The actuators are generally divided into three categories, namely electric, pneumatic, and hydraulic. Pneumatic and hydraulic actuators are referred to as fluid power actuators. The most common types consist of a linear power source in the form of a fluid power cylinder and piston, plus a device to translate from linear motion to rotary motion.

There are three principle mechanisms used to convert from linear to rotary motion, namely a rack and pinion gear set, and a device known as a scotch yoke, and a simple link and lever. The rack and pinion gear and the scotch yoke have become dominant in the field of valve actuation. These mechanisms, however, have inherent limitations and properties that cause problems in their application, and leave them less than ideal.

The rack and pinion device requires a restraining bearing behind the rack to keep it from jumping off the teeth of the pinion gear. This bearing introduces considerable friction and "sticktion," and there is backlash and lost motion between the teeth of the rack and the pinion gear, amplified greatly by any wear of the restraining bearing.

The scotch yoke has a nonlinear torque output with respect to position, which requires sizing to the lowest torque output, typically about 60% of maximum, adding cost when applying these actuators. The nonlinear torque output is undesirable in some applications. Under load, the changing torque output can cause acceleration of stroking in the increasing torque direction, and deceleration in the decreasing torque direction, which is why this style of actuator, in the larger sizes, has a reputation for lurching as it strokes. Its mechanism causes a large sideways force on the cylinder's piston rod, requiring lateral bearing support, at some cost. The piston rod flexes due to the lateral force, making this mechanism prone to hysteresis and lost motion, as well as adding to the influences that cause the lurching.

The link and lever mechanism has so many limitations in its application, including nonlinear torque output as in the case of the scotch yoke, that it has been almost completely replaced by the rack and pinion and scotch yoke mechanisms.

A fourth mechanism exists for converting linear motion to rotary motion, but it is used only in some special applications, not as a rotary valve actuator. It consists of a double-ended fluid power cylinder, a loop of chain fastened at each end to the two ends of the piston rods, and two sprocket wheels, one for the torque output shaft and one as a simple idler, all as shown in FIG. 4. Compared to valve actuators, it has relatively high cost, awkward size, and extra friction from the extra wheel. The size is awkward because the unit must have a long dimension of more than three times the length of the cylinder plus one sprocket wheel diameter. The subject invention differs in that it uses a single-ended cylinder, has a heavy plate and double wrapped tangent wheels, resulting in the subject invention having only one rotating component and one set of bearings, not two of each, and it employs different chains for each direction, and it can alternatively employ a plate, wheel, and silent thin metal straps.

BRIEF SUMMARY OF THE INVENTION

The present exemplary embodiment provides a simple, economical and practical method of translation from a linear motion and force to rotary motion and force, that overcomes the problems and limitations of rack and pinion, scotch yokes, and link and lever mechanisms. The device is easy to assemble and to maintain and repair. One important feature of this novel device is that critical components are low cost, standardized precision parts that are readily available. Another feature is that force-transmitting parts are in constant tension, so there is no lost motion or hysteresis in power reversal. Another feature is that normal wear is taken up by the tensioning system. Using precision ball or roller bearings at the output shaft, there is negligible lost motion or hysteresis in the output rotation. This is particularly important in throttling control valve applications and other applications where precise positioning is required, without adding high cost. Another feature is that, unlike other actuators, this device is inherently self-aligning because force-transmitting members do so in tension, so this device requires no lateral guiding of the force parts, avoiding the friction and "sticktion" that such bearings introduce. A further advantage to this device is that the torque is constant throughout the stroke, so actuator selection is simplified and more economical because a smaller actuator can often be used. A still further advantage is that the assembly is compact and can be housed in an enclosure to protect against dirt.

Excluding the cylinder, high temperature environments are well handled, since there are no soft or elastomeric parts, and all thermal expansions and differences thereof are taken up and compensated for by the tensioning system. A major feature of this mechanism is that it lends itself well to actuators that must turn over 90°, as is common in actuation of multi-port valves. This actuator can accommodate 120°, 180°, and even more, all of which are impossible with the scotch yoke or link and lever mechanisms. Another feature is that components are light in weight, capable of high stroke speeds without damage. A further feature is that, since the low cost purchased parts are inherently precision parts, there is little close tolerance machining required by the manufacturer.

In an exemplary embodiment of the invention, a rotary valve actuator includes a plate member coupled with a linear motive source, which reciprocates the plate member between a first position and a second position. A first wheel is rotatably supported adjacent the plate member, and a second wheel is rotatably supported adjacent the plate member and coaxial with the first wheel and fastened thereto. A first connector is attached to an end of the plate member farthest from the linear motive source and engaging the first wheel, and a second connector is attached to an opposite end of the plate member closest to the linear motive source and engaging the second wheel. When the linear motive source drives the plate member in a direction toward the second position, the first connector drives the first and second wheels in a first direction, and when the linear motive source drives the plate member in a direction toward the first position, the second connector drives the first and second wheels in a second direction, opposite from the first direction.

The linear motive source is preferably a hydraulic cylinder including a cylinder and a cylinder rod. The first and second wheels may be secured to a rotatable shaft having a through bore, where a valve shaft is attachable to the through bore for rotation with the through bore. The actuator may include two first wheels to which a corresponding two first connectors are attached and two second wheels to which a corresponding two second connectors are attached, where the two first wheels are disposed sandwiched by the second wheels.

In a preferred arrangement, the first wheel and the second wheel are sprocket wheels, and the connectors are chains such as roller chains or silent chains. In one arrangement, the first wheel is comprised of a sector of a pulley wheel, and the connectors are flexible straps, for example, metal straps.

The linear motive source, the plate member, the first and second wheels and the connectors may be sized such that the rotary valve actuator is rotatable through 90° or 180° or more.

The actuator may additionally include a connector tensioning assembly secured to the plate member and cooperating with at least one of the connectors to maintain a tension force on the connectors. In this context, the connector tensioning assembly may include a rocker bar acting between the first connector and a tensioning screw, where a position of the tensioning screw relative to the rocker bar effects a mechanical advantage. Preferably, the connector tensioning assembly includes a block mounted on the plate member, a rocker bar pivotable on a fulcrum point at an end of the plate member; and an adjustable link connected in tension between the block and a first end of the rocker bar on one side of the fulcrum point. The first connector is connected to a second end of the rocker bar on an opposite side of the fulcrum point. In this context, a tension force on the adjustable link may be derived from a stack of Belleville washers.

In another exemplary embodiment of the invention, a rotary valve actuator includes a plate member coupled with a linear motive source that reciprocates the plate member between a first position and a second position, the first and second wheels rotatably supported adjacent the plate member, and the first and second connectors. The actuator additionally includes a connector tensioning assembly secured to the plate member and cooperating with at least one of the first and second connectors to maintain a tension force on the connectors. The connector tensioning assembly includes a rocker bar acting between the first connector and a tensioning screw, where a position of the tensioning screw relative to the rocker bar effects a mechanical advantage.

In still another exemplary embodiment of the invention, a rotary valve actuator includes a rotary member coupleable with a rotary valve, driving structure connected to the rotary member for rotating the rotary member in a first direction and a second direction via at least one link between the rotary member and the driving structure, and structure for maintaining a tensioning force on the link.

BRIEF DESCRIPTION OF THE DRAWINGS

These and other aspects and advantages of the present invention will be described in detail with reference to the accompanying drawings, in which:

FIGS. 3A and 3B show respectively the alternative embodiment at the 0° start position and the 90° end of stroke position, and FIGS. 3C and 3D show respectively the plan view and the end view of the moving parts at the 0° start position.

DETAILED DESCRIPTION OF THE INVENTION

Figure 1:
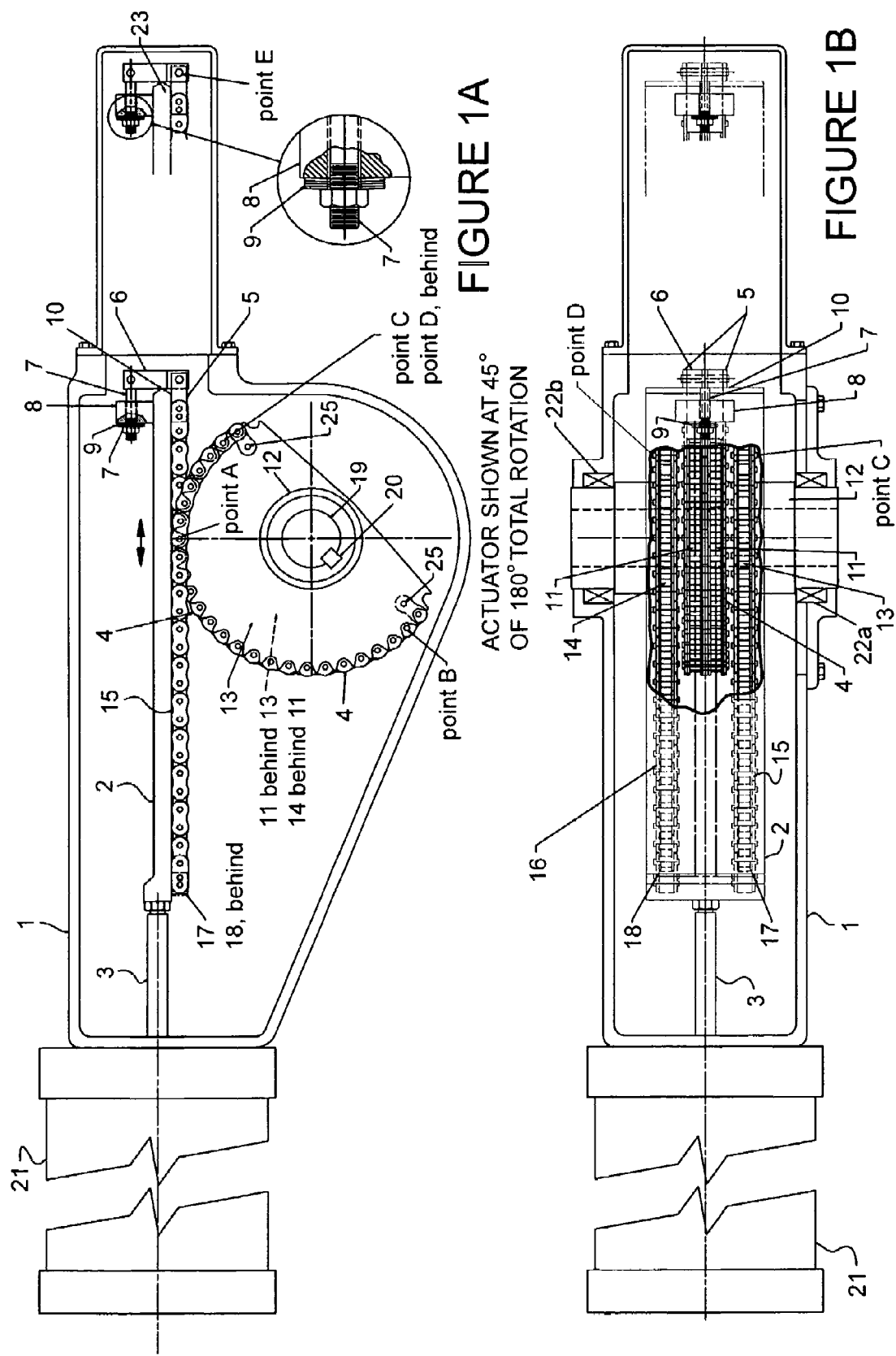
FIGS. 1A and 1B show side and plan views, respectively, of the rotary valve actuator of an exemplary embodiment.

FIGS. 1A and 1B show the mechanism of a 180° actuator. Such an actuator is impossible with either a link and lever or a scotch yoke, but is easy to achieve with this device. A housing 1 contains a flat metal plate 2, pushed by a cylinder rod 3, that moves from left to right and back. A double roller chain 4 serves as a first connector, and is attached to plate 2 by links 5 that connect to rocker bar 6. An adjustable threaded rod with nut 7 passes through a block 8 mounted on plate 2. A stack of Belleville washers 9 are placed under adjusting nut 7. Rocker bar 6 pivots on fulcrum 10, thus applying a constant tensioning force from washers 9, through rod 7, into rocking bar 6, therefore pulling on links 5 and into double chain 4. Double chain 4 lays against the underside of plate 2 from links 5 to Point A, a tangent point on double sprocket wheel 11. Wheel 11 is rigidly mounted on a shaft 12. Double chain 4 then continues by wrapping around double sprocket wheel 11, from Point A to Point B, where it is attached to double sprocket wheel 11 with a fastener 25. Two single sprocket wheels 13 and 14 are also rigidly mounted on shaft 12, one on each side of double sprocket wheel 11, and they are the same as wheel 11, except that they are single sprocket wheels. Two single roller chains 15 and 16, matching double chain 4, serve as second connectors and are fastened at their ends 17 and 18 respectively to plate 2. They also lay under plate 2 and meet single sprocket wheels 13 and 14 at Point A, whence they wrap around those wheels 13 and 14 to Points C and D respectively, where they are attached to wheels 13 and 14 by fasteners 25. It should be noted that as double chain 4 is tensioned by links 5, sprocket wheel 11 tries to rotate, whereby sprocket wheels 13 and 14 immediately impart the same tension force into chains 15 and 16, pulling them taut and eliminating backlash and lost motion. The tension in the chains holds them firmly against their respective wheels and against plate 2.

Shaft 12 has a through bore 19 and keyway 20 to impart torque to a valve shaft (not shown).

When fluid pressure is applied to cylinder 21, cylinder rod 3 pushes plate 2 to the right in FIG. 1. Links 5 pull on chain 4, which turns double sprocket wheel 11 and shaft 12 clockwise. Shaft 12 is mounted in bearings 22a and 22b, so a valve shaft in bore 19 will be turned. Chains 15 and 16 will be taken up on sprocket wheels 13 and 14 during the rotation. Motion continues until an end 23 of plate 2 reaches point E, whereupon shaft 12 with its bore 19 will have completed 180° of rotation. The cylinder rod 3 of cylinder 21 may be stopped in its motion by a stop internal to cylinder 21, at this point.

When the fluid power is reversed, and cylinder rod 3 retracts and moves in the opposite direction, the fastening of chains 15 and 16 to plate 2 at 17 and 18 pulls on chains 15 and 16, which causes wheels 13 and 14 to rotate in a counterclockwise direction, rotating shaft 12 with its bore 19 counterclockwise, until they are rotated 180° counterclockwise, and an internal stop in cylinder 21 stops the motion. During the rotation, double chain 4 is again wrapped around double sprocket wheel 11.

Naturally, a "silent chain" can be employed in place of roller chain in this actuator mechanism, with a little greater precision and slightly higher cost than with roller chain.

Figure 2:
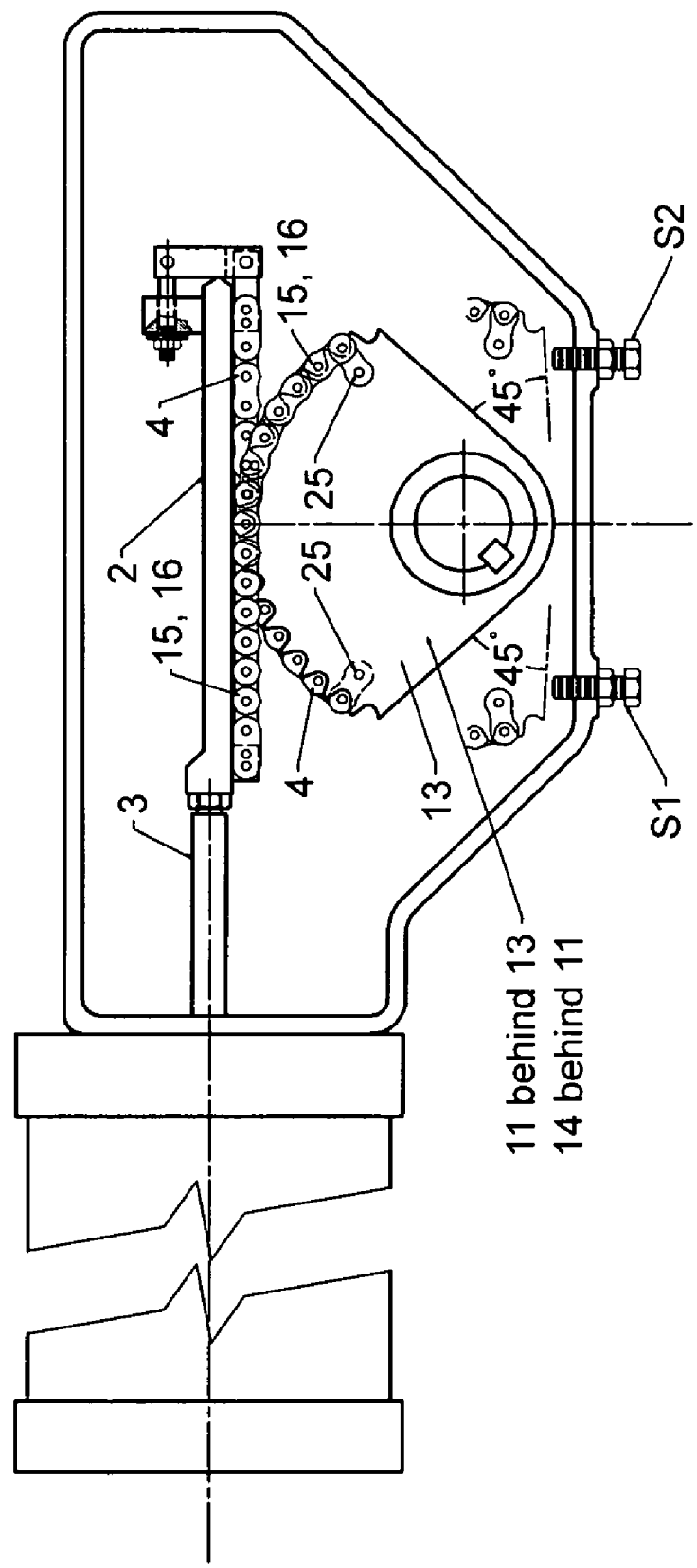
FIG. 2 is a side view of an alternative rotary valve actuator.

A second embodiment of the invention is shown in FIG. 2. Unlike FIG. 1, which showed the more difficult, by some prior art methods even impossible, 180° actuator, this figure shows an embodiment where the angle or rotation is only the more common 90°. FIG. 2 shows the actuator in mid travel. Components are numbered the same as in FIG. 1 because they are the same type, but include a shorter plate 2 and sprocket wheels of a small sector form. Arrangement of sprocket wheels 11, 13 and 14, and chains 4, 15 and 16, are exactly the same. This embodiment conveniently includes two adjustable travel stops S1 and S2 in the housing, one for each end of the rotary travel.

Figure 3A:
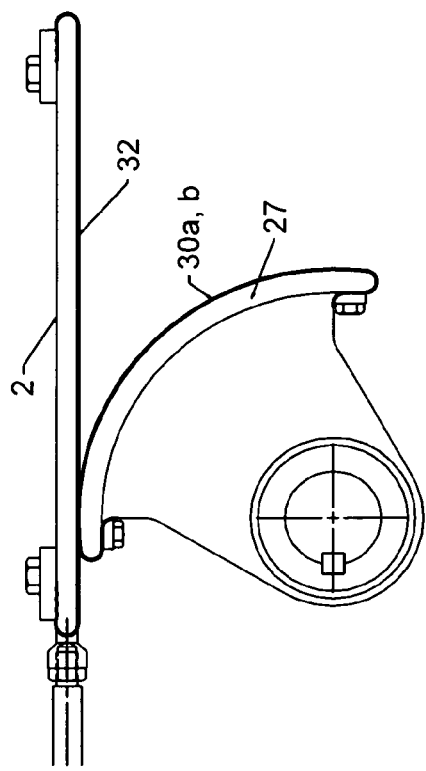
FIGS. 3A, 3B, 3C and 3D show the primary moving parts of yet another alternative embodiment of the present invention, without the cylinder or housing, where
Figure 3C:
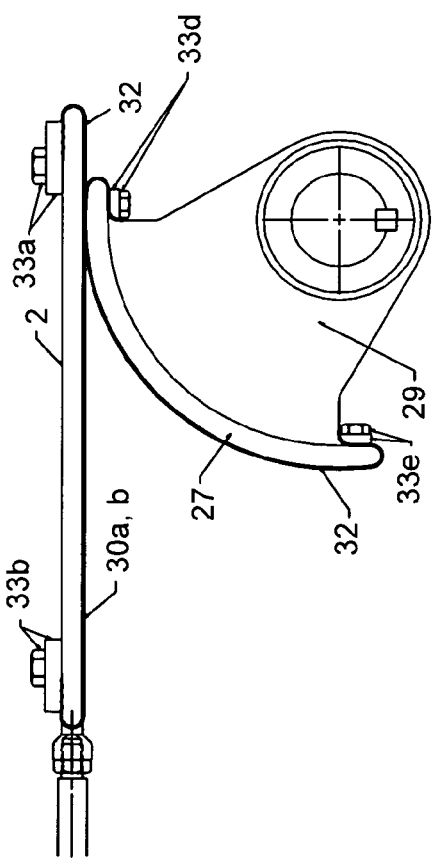

Another embodiment is shown in FIGS. 3A, 3B, 3C and 3D, where another 90° actuator is depicted. Here, flexible metal straps 30a, 30b and 32 are used instead of roller chains for the connectors, and a sector of a smooth pulley wheel 27, with web 29 and wheel hub 28 is used instead of sprocket wheels 11, 13 and 14. FIG. 3A shows the actuator in the 0° start position. In this embodiment, a double width strap 32 is placed in the middle of plate 2, replacing double chain 4, and is fastened to the plate 2 at the end farthest from the cylinder rod 3 by block 33a. The strap 32 wraps around wheel 27 and is fastened to it by block 33e. Two straps 30a and 30b, each of one half the width of strap 32, are placed on either side of strap 32, replacing chains 15 and 16, and are fastened at one of their ends by blocks 33b and 33c to plate 2 at the end closest to cylinder rod 3. The straps 30a, 30b are fastened at their other ends to wheel sector 27 by blocks 33d and 33e. The three straps 30a, 30b and 32 are preferably of equal thickness.

Figure 3B:
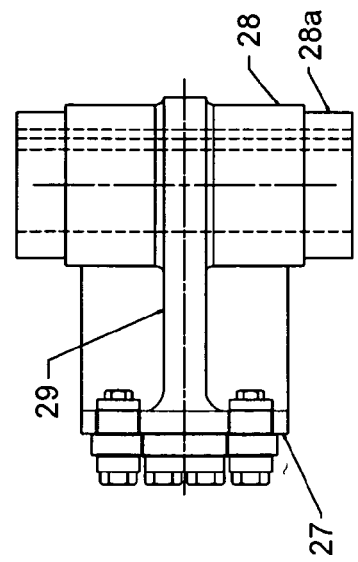
Figure 3D:
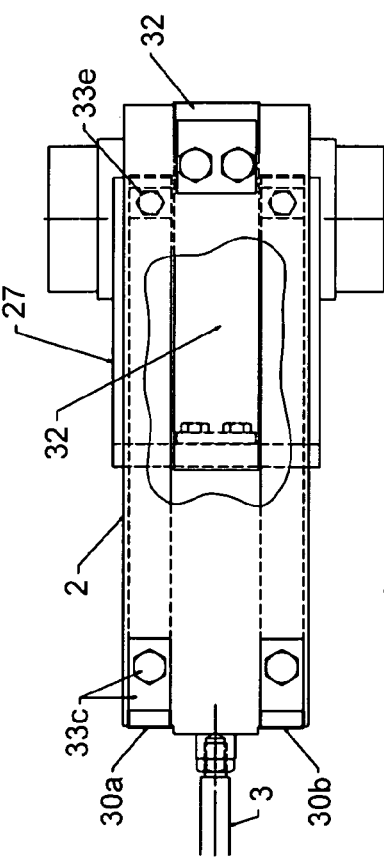
Figure 4:
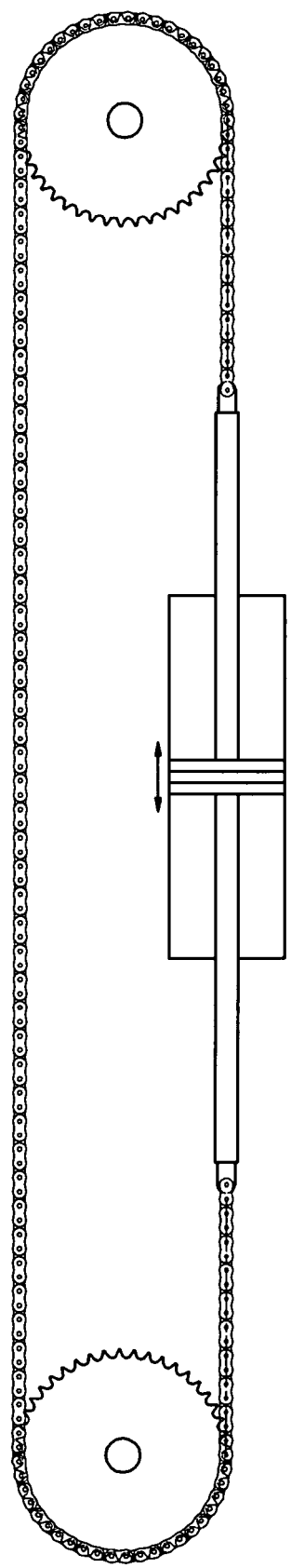
FIG. 4 shows an existing device for translating linear motion to rotary motion that also employs a cylinder, chain, and sprocket wheels, but it is not used as a general purpose valve actuator.

When fluid pressure is applied to the cylinder and cylinder rod 3 pushes plate 2 to the right in FIG. 3A, strap 32 causes wheel 27 to rotate clockwise, until plate 2 and wheel 27 reach their positions shown in FIG. 3B. Hub 28 will have been rotated 90°. A suitably positioned mechanical stop in the cylinder or the housing (not shown) stops the rotation after the 90° rotation. When the cylinder rod reverses and pulls plate 2 to the left in FIG. 3B, straps 30a and 30b cause wheel 27 to rotate counterclockwise, back to the original position in FIG. 3A, A suitable mechanical stop stops the rotation. This embodiment of wheel and flexible straps is also ideal for 120 and 180° actuators. While the lubricated roller chain shown in FIGS. 1 and 2 has very little friction in its flexing while it goes on and off sprocket wheels, the FIG. 3 embodiment exhibits virtually zero friction in the force members as the plate moves freely and the straps lay onto and roll off the sector wheel, a feature unique from all other actuators. The only friction, from cylinder rod connection onwards, is in the output shaft bearings, common to all rotary actuators. As in the case of the chain and sprocket wheel alternative, this strap and wheel sector mechanism is self aligning, without need for guiding or lateral bearings.

It will be recognized that there are many ways to impart tension to the chain or the metal straps, so many that it would not be feasible to show all or most of them. The method shown in FIGS. 1 and 2 can also be employed in the mechanism of FIG. 3. One advantage of the method shown, using a rocker bar, is that by positioning the tensioning screw relative to the fulcrum point and the connection to the end of the chain or strap, a mechanical advantage can be realized, which makes the Belleville washers more effective. Another advantage is that the method allows for different thermal expansions of the chain or straps compared to those of the plate, or the sector, or the housing, avoiding high thermally-induced forces onto the parts, which otherwise could cause damage.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A rotary valve actuator, comprising:
   a reciprocatable member coupled with a linear motive source, the motive source reciprocating the reciprocatable member along an axis between a first position and a second position;
   at least one arcuate member rotatably supported adjacent the reciprocatable member;
   a pair of first flexible connectors attached at first ends thereof to the reciprocatable member towards one end of the reciprocatable member, said connectors engaging the at least one arcuate member along its circumference and being attached at second ends thereof to said at least one arcuate member; and
   at least one second flexible connector disposed between said pair of first flexible connectors, attached at a first end thereof to the reciprocatable member towards an other end of the reciprocatable member, said at least one second connector engaging the at least one arcuate member along its circumference and being attached at a second end thereof to said at least one arcuate member,
   wherein, when the linear motive source drives the reciprocatable member in a direction toward the first position, the pair of first flexible connectors drives the at least one arcuate member in a first direction, and wherein, when the linear motive source drives the reciprocatable member in a direction toward the second position, the at least one second flexible connector drives the at least one arcuate member in a second direction, opposite from the first direction, and
   a connector tensioning assembly secured to the reciprocatable member and cooperating with at least one of the flexible connectors to maintain a tension force on the connectors,
   wherein the connector tensioning assembly comprises:
   a block mounted on the reciprocatable member;
   a rocker bar pivotable on a fulcrum point at an end of the reciprocatable member; and
   an adjustable link connected in tension between the block and a first portion of the rocker bar on one side of the fulcrum point,
   wherein the at least one flexible connector is connected to a second portion of the rocker bar on an opposite side of the fulcrum point.

2. A rotary valve actuator according to claim 1, wherein the linear motive source comprises a hydraulic cylinder including a cylinder and a cylinder rod.

3. A rotary valve actuator according to claim 1, wherein the at least one arcuate member is secured to a rotatable shaft having a through bore, and wherein a valve shaft is attachable to the through bore for rotation with the through bore.

4. A rotary valve actuator according to claim 1, wherein said at least one arcuate member comprises:
   two first arcuate members respectively connected to corresponding ones of said pair of first flexible connectors and two second arcuate members respectively connected to corresponding ones of two second flexible connectors, the two second arcuate members being disposed centrally between the first arcuate members.

5. A rotary valve actuator according to claim 1, wherein the at least one arcuate member comprises at least segments of sprocket wheels, and wherein the flexible connectors comprise chains.

6. A rotary valve actuator according to claim 5, wherein the flexible connectors comprise roller chains.

7. A rotary valve actuator according to claim 5, wherein the flexible connectors comprise silent chains.

8. A rotary valve actuator according to claim 1, wherein the at least one arcuate member is comprised of a sector of a pulley wheel, and wherein the flexible connectors comprise flexible straps.

9. A rotary valve actuator according to claim 8, wherein the flexible straps are flexible metal straps.

10. A rotary valve actuator according to claim 1, wherein the linear motive source, the plate member, the at least one arcuate member and the flexible connectors are sized such that the rotary valve actuator is rotatable through 180°.

11. A rotary valve actuator according to claim 1, wherein the linear motive source, the reciprocatable member, the at least one wheel and the flexible connectors are sized such that the rotary valve actuator is rotatable through 90°.

12. A rotary valve actuator according to claim 1, wherein the connector tensioning assembly comprises a rocker bar acting between at least one flexible connector and a tensioning screw, a position of the tensioning screw relative to the rocker bar effecting a mechanical advantage.

13. A rotary valve actuator according to claim 1, wherein a tension force on the adjustable link is derived from a stack of Belleville washers.

14. A rotary valve actuator comprising:
a rotary member coupleable with a rotary valve;
a linearly reciprocatable driving member connected to the rotary member for rotating the rotary member in a first direction and a second direction via at least one flexible elongated link connected between the rotary member and the driving member; and
a rocker bar providing a fulcrum acting as a lever to increase tensioning force applied between the flexible link and a tensioning screw for maintaining a tensioning force on the link.

15. A rotary valve actuator according to claim 14, comprising a block attached to the driving member, and wherein the tensioning screw connects the block and the rocker bar.

16. A rotary valve actuator according to claim 15, wherein a tensioning force is derived from a stack of Belleville washers.

17. A rotary actuator for translating from precise linear motion to precise rotary motion, said actuator comprising:
a reciprocating linear power source, said power source being connected to a plate to cause reciprocal movements in a longitudinal direction thereof;
a first pair of flexible members attached to said plate towards one end thereof, said first pair of flexible members being disposed side-by-side along an underside of said plate;
a first pair of arcuate members mounted adjacent to the underside of said plate, said first pair of flexible members passing between said plate and said first pair of arcuate members and wrapping partially around the circumference of respectively corresponding ones of said first pair of arcuate members and fastened thereto;
a second pair of flexible members attached to said plate towards an opposite end thereof, said second pair of flexible members also being disposed along the underside of said plate but positioned to straddle said first pair of flexible members,
a second pair of arcuate members also mounted adjacent to the underside of said plate, coaxial with said first pair of arcuate members and straddling said first pair of arcuate members, said second pair of flexible members passing between said plate and said second pair of arcuate members and wrapping partially around the circumference of said second pair of arcuate members and fastened thereto;
said two pairs of arcuate members being mounted on a hollow shaft, said shaft being supported at each end in precision bearings,
wherein precise linear longitudinal movements of said plate cause corresponding precise rotary motion of said shaft.

18. A rotary actuator as in claim 17, wherein said first pair of flexible members comprise a double roller chain.

19. A rotary actuator as in claim 17, wherein said second pair of flexible members comprise two single roller chains.

20. A rotary actuator as in claim 17, wherein said two pairs of arcuate members comprise at least segments of sprocket wheels.

21. A rotary actuator as in claim 17, wherein the hollow shaft is broached with female splines or a keyway.

* * * * *